No. 712,144. Patented Oct. 28, 1902.
R. L. MacHALE.
DOUGH MIXING MACHINE.
(Application filed Aug. 4, 1902.)
(No Model.) 2 Sheets—Sheet 1.

WITNESSES:
INVENTOR
R. L. MacHale
BY
ATTORNEY

THE NORRIS PETERS CO., PHOTO-LITHO., WASHINGTON, D. C.

No. 712,144. Patented Oct. 28, 1902.
R. L. MacHALE.
DOUGH MIXING MACHINE.
(Application filed Aug. 4, 1902.)
(No Model.) 2 Sheets—Sheet 2.

WITNESSES:
INVENTOR
R. L. MacHale
BY Oscar Funz
his ATTORNEY

UNITED STATES PATENT OFFICE.

RICHARD L. MacHALE, OF NEW YORK, N. Y.

DOUGH-MIXING MACHINE.

SPECIFICATION forming part of Letters Patent No. 712,144, dated October 28, 1902.

Application filed August 4, 1902. Serial No. 118,221. (No model.)

*To all whom it may concern:*

Be it known that I, RICHARD L. MACHALE, a citizen of the United States, residing at the city of New York, in the borough of Manhattan, in the county and State of New York, have invented certain new and useful Improvements in Dough-Mixing Machines, of which the following is a specification.

The object of my invention is to provide a new and improved dough-mixing machine which is strong and durable, simple in construction, thoroughly works and mixes the dough to a perfect consistency in a very short time, and from which mixing-machine the dough can be discharged very easily and rapidly.

Figure 1:
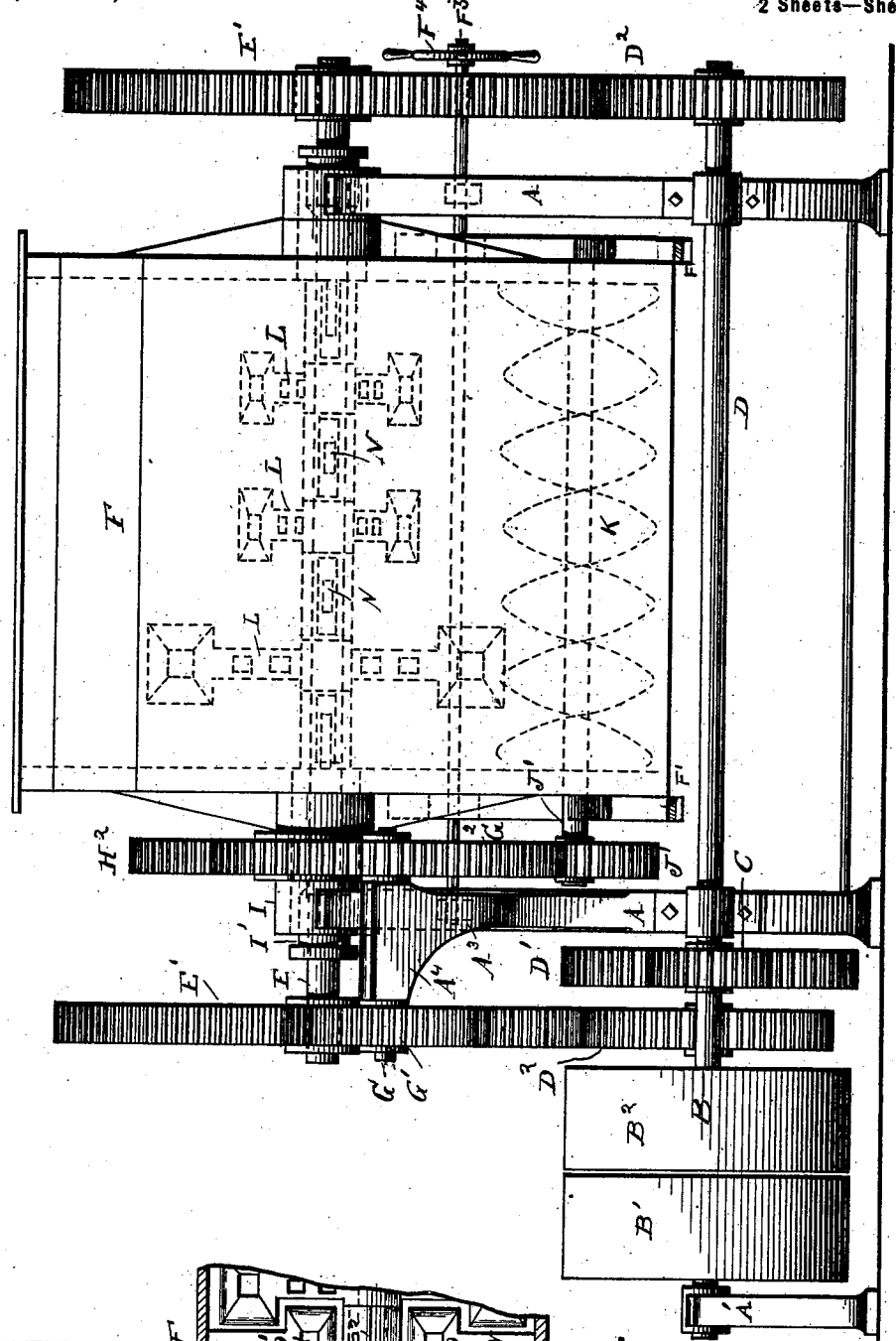
Figure 2:
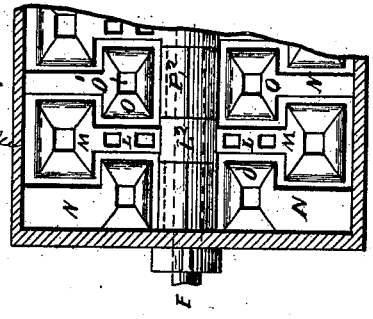
Figure 3:
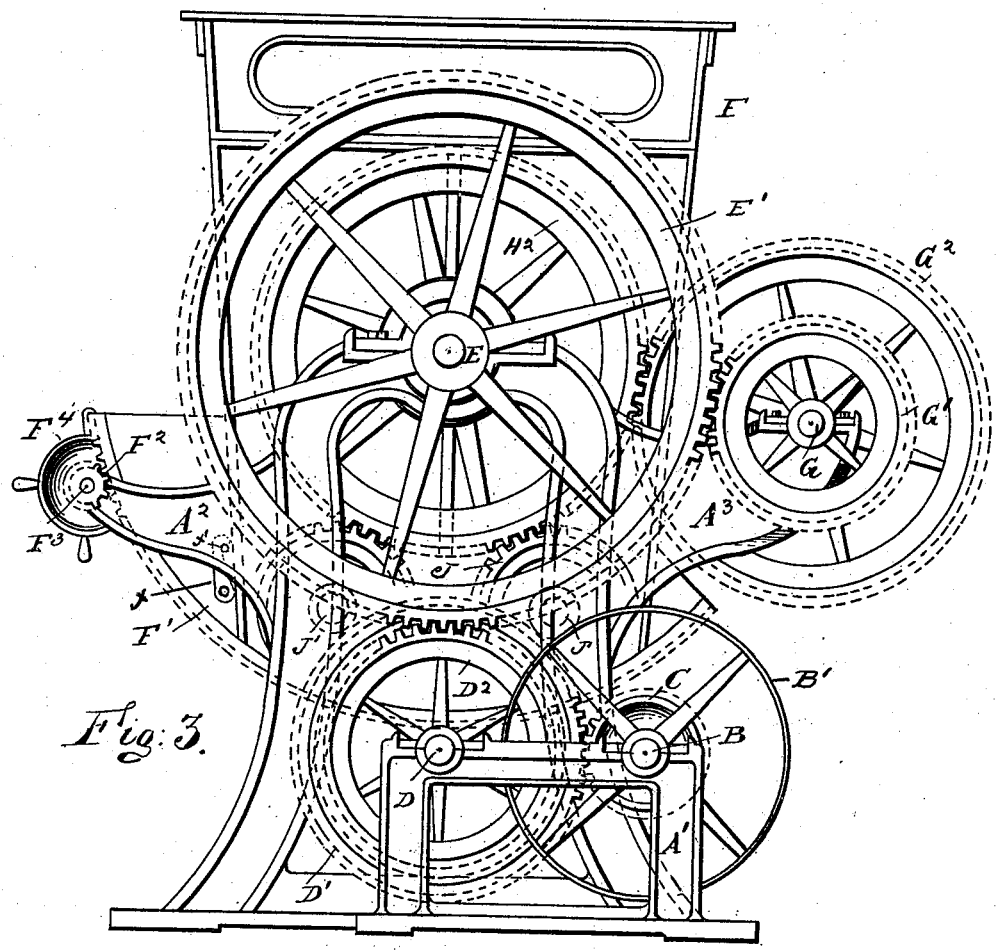
Figure 4:
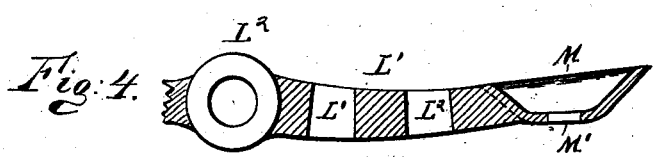
Figure 5:
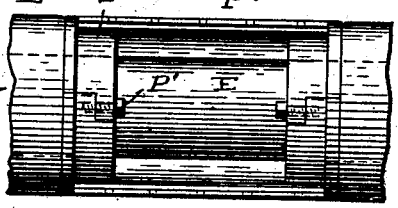

In the accompanying drawings, in which like letters of reference indicate like parts in all the figures, Figure 1 is a side elevation of my improved dough-mixing machine. Fig. 2 is a plan view of part of the same, parts of the trough being shown in section and parts broken away. Fig. 3 is an end elevation of my improved dough-mixing machine. Fig. 4 is a detail vertical longitudinal sectional view of one of the beater-arms on the main shaft. Fig. 5 is a detail view of the sleeve between the hubs of the beater-arms on the main shaft.

Two standards A form the main frames of the machine, and in said two main frames or standards and an auxiliary standard A' a driving-shaft B is journaled in suitable bearings and carries the fixed and loose pulleys B' and B², of any conventional construction. This shaft B also carries a cog-wheel C, which engages a cog-wheel D' on a shaft D, mounted in both standards A and the auxiliary standard A', and this shaft D carries on the outer side of each standard A a cog-wheel D², which each engages a large cog-wheel E', fixed on opposite ends of a shaft E, mounted in the standards A and passing longitudinally through a substantially U-shaped trough F, located between the standards A.

The trough F is provided at each end with a toothed segment F' at the bottom, and these two segments engage pinions F² on a shaft F³, mounted horizontally in brackets A² of the standards A, said shaft F³ being parallel with the shaft E and at one side of the trough F. A hand-wheel F⁴ or other contrivance for rotating the shaft F³ is provided on the same, so that by rotating said shaft F³ the trough F can be turned on the shaft E as a pivot—that is to say, the bottom can be swung upward toward one side and the top downward toward the other side—and the trough thus tilted for the purpose of ejecting or discharging the dough. One of the standards A is provided with a bracket A³ on the end opposite the one having a bracket A², and in an enlargement A⁴ at the upper end of this bracket a short shaft G is mounted horizontally. One end of this shaft G carries a cog-wheel G', engaging one of the large cog-wheels E' on the shaft E, and at its opposite end this shaft G carries a larger cog-wheel G², which engages a cog-wheel H², mounted on a sleeve I, in which the stuffing-box I' for the shaft E is located.

The wheel H² turns loosely on the sleeve I and is engaged with two cog-wheels J, fixed on two parallel horizontal shafts J', mounted in the bottom part of the trough and projecting from one end of the same. Within the trough each shaft J' carries a screw or worm K, located close to the bottom of the trough. When the wheels E' are rotated from the driving-shaft, one of these wheels rotates the wheel G', whereby the wheel G² is rotated, and this rotates the wheel H², from which the two wheels J and their shafts J' and the worms K thereon are rotated.

The worms rotating in the bottom of the trough constantly keep the mixture of flour and water which is to be converted into dough moving forward and backward in the bottom of the trough and agitate and work it thoroughly and cause a most intimate mixture of the water and flour, as the two worms constantly cut and slice the mixture of flour and water.

On the shaft E three or more pairs of oppositely-extending arms L are keyed or otherwise secured within the trough F. These arms are provided with openings L' and at their free ends have rectangular cups M, the four sides of which are inclined inward and toward a central bottom opening M' in the cup. The arms L may be straight or may be slightly curved, as shown in Fig. 4. Between each two arms L an arm N projects horizontally from the inner surface of each side wall of the trough, which arms N are also provided with rectangular cups O like the cups M, which cups O have central openings O'. Such arms N and cups O are also provided on the inner surface of the end walls of the trough F. As the arms L rotate in the trough they seize the dough in the lower part of the trough and pull it upward and draw it up between the cups O and the fixed arms N, and the arms L also cut through the dough. As the arms are provided with the openings L', and the cups M with the openings M', and the cups O with the openings O', large quantities of air are drawn into the dough—that is to say, as the arms L rotate and the dough encounters the fixed arms N the dough is drawn into strips and shreds, which are then pressed together as the dough is delivered upon the arms N on the other side, and thus the air is confined in the interstices formed in the dough. It is very essential to have as much air incorporated in the dough as possible, and by providing the arms and cups many spaces for air are produced in the dough. The inclined or beveled cups M and O having the openings M' and O' also produce additional movements in the dough and agitate the same to a still greater extent.

Flanged half-rings P, held together by screws P', are applied on the shaft E between the hubs $L^2$ of the arms L, and on these rings P half-cylinders $P^2$ are secured between the flanges of the rings, which rings and half-cylinders prevent any accidental displacement or shifting of the hubs $L^2$ on the shaft E in the direction of the length of the shaft.

When the dough has been mixed, worked, and agitated to the desired degree, the hand-wheel $F^4$ is turned for the purpose of tilting the trough, the driving-shaft now being at rest. While the trough is being tilted the wheels J roll on the wheel $H^2$, and thus are slowly rotated, and this slow rotation of the wheels J and worms K causes the loosening of the dough in the trough, and these movements of the screws K cause the dough to be discharged readily through the opening of the tilted trough.

After all the dough has been removed the parts are brought back into the positions shown in Figs. 1 and 3 and a fresh batch of dough can be mixed, and so on.

Pins $x'$ and latches $x$ are provided for locking the trough in place while mixing the dough.

Having described my invention, what I claim as new, and desire to secure by Letters Patent, is—

1. In a dough-mixing machine, the combination with a trough, of a shaft passing longitudinally through the same, arms on said shaft, worms in the bottom of the trough, gearing for rotating the shaft, a cog-wheel mounted loosely on the shaft outside of the trough, means for rotating said loose wheel from the gearing for rotating the shaft and cog-wheels on the worm-shafts engaging said loose cog-wheel, substantially as set forth.

2. In a dough-mixing machine, the combination with a trough, of a shaft passing longitudinally through the same means for tilting said trough on said shaft, gearing for rotating the shaft, a cog-wheel mounted loosely on the shaft outside of the trough, gearing for rotating said loose cog-wheel from the gearing for rotating the shaft, two worms in the bottom of the trough, cog-wheels on the ends of the shafts of said worms, which cog-wheels engage the loose cog-wheel on the shaft, substantially as set forth.

3. In a dough-mixing machine, the combination with a trough, of a shaft on which said trough is mounted to tilt toothed segments on the bottom of the trough, cog-wheels engaging said two segments, means for turning said cog-wheels, arms on the shaft within the trough, gearing for rotating the shaft, a cog-wheel mounted loosely on the shaft outside of the trough, two worms in the bottom of the trough, cog-wheels on the shafts of said worms outside of the trough and engaging the loose cog-wheel, substantially as set forth.

4. In a dough-mixing machine, the combination with two standards, of a main shaft journaled in the same, a cog-wheel fixed on each end of the shaft, a driving cog-wheel engaging each of said cog-wheels on the shaft, a bracket on one standard, a shaft in said bracket, cog-wheels on said shaft, one of which cog-wheels engages one of the cog-wheels on the shaft, a cog-wheel mounted loosely on the main shaft and engaging the other one of said two cog-wheels of the shaft mounted on the bracket, a trough suspended from the main shaft, between the two end cog-wheels, arms on the shaft within the trough, two worms in the bottom of the trough, cog-wheels on the shafts of said worms, which cog-wheels engage the loose cog-wheel, on the main shaft substantially as set forth.

5. In a dough-mixing machine the combination with a trough, of a shaft, arms projecting from said shaft within the trough and having cups on their outer ends, arms projecting inward from the inner surfaces of the sides of the trough and having cups on their free ends, and means for rotating the shaft in the trough, substantially as set forth.

6. In a dough-mixing machine, the combination with a trough, of a shaft passing longitudinally through it, arms projecting from said shaft, which arms have slots extending from top to bottom, and have cups on their free ends, which cups have their inner surfaces inclined inward and downward, and openings in the bottoms of the cups and rigid arms projecting from the inner surfaces of the side walls of the trough between the arms on the shaft, substantially as set forth.

7. In a dough-mixing machine, the combination with a trough, of a shaft passing longitudinally through the same, arms on said shaft, hubs from which said arms project, flanged half-rings applied on the shaft adjacent to the hubs, and two half-cylinders surrounding the shaft, the half-cylinders being placed between the inner faces of the flanges of said rings, substantially as set forth.

In testimony whereof I have signed my name to this specification, in the presence of two subscribing witnesses, this 9th day of July, 1902.

RICHARD L. MacHALE.

Witnesses:
J. J. GILBERT,
OSCAR F. GUNZ.